United States Patent [19]

Chen

[11] Patent Number: 5,018,842
[45] Date of Patent: May 28, 1991

[54] OPTICAL SWITCH DEVICE

[75] Inventor: Wenpeng Chen, Bethesda, Md.

[73] Assignee: Martin Marietta Corporation, Bethesda, Md.

[21] Appl. No.: 178,669

[22] Filed: Apr. 7, 1988

[51] Int. Cl.$^5$ .......................... G02B 5/23; G02F 1/01
[52] U.S. Cl. ..................................... 350/354; 350/353
[58] Field of Search ............................. 350/353, 354

[56] References Cited

U.S. PATENT DOCUMENTS

| | | | |
|---|---|---|---|
| 3,434,779 | 3/1969 | Damen et al. | 350/160 |
| 3,492,062 | 1/1970 | Hoover, III | 350/354 |
| 3,620,597 | 11/1971 | Schwartz et al. | 350/354 X |
| 4,260,225 | 4/1981 | Walles | 350/353 |
| 4,261,331 | 4/1981 | Stephens | 350/353 X |
| 4,776,677 | 10/1988 | Park et al. | 350/354 |
| 4,789,228 | 12/1988 | Le Pesant et al. | 350/355 |

FOREIGN PATENT DOCUMENTS 0124622 11/1984 European Pat. Off. .

OTHER PUBLICATIONS

IEEE Journal of Quantum Electronics, vol. QE-19, No. 4, Apr. 1983, IEEE (New York, U.S.), J. J. Soileau et al.: "Optical Power Limiter with Picosecond Response Time", pp. 731-735.
IEEE Journal of Quantum Electronics, vol. QE-20, No. 1, Jan. 1984, IEEE (New York, U.S.), P. W. Smith, et al.: "Nonlinear Optical Interfaces: Switching Behavior", pp. 30-36.
Optics Communications, vol. 56, No. 2, Nov. 1985, Elsevier Science Publishers B.V. (North-Holland Physics Publishing Division), (Amsterdam, NL), G. B. Altshuller et al.: "Nonlinear Reflection of Picosecond Pulses from a Glass-Liquid Interface", pp. 131-135.
Patent Abstracts of Japan, vol. 10, No. 111, (P-451) (2168), Apr. 25, 1986 & JP, A, 60243642 (Canon K.K.) Dec. 3, 1985.

Primary Examiner—Eugene R. LeRoche
Assistant Examiner—Michael B. Shingleton
Attorney, Agent, or Firm—Gay Chin; James B. Eisel

[57] ABSTRACT

An optical power limiter and switch, transparent at low light intensity and opaque at high intensity, is comprised of a pair of right triangular prisms separated by a liquid film whose refractive index changes in response to optical energy. A first or input lens focuses the light upon the liquid film at an angle less than the critical angle of total reflection of the prism-liquid interface and a second or output lens refocuses the energy to a detector through an aperture. When the intensity of the optical energy reaches a first predetermined level, the optical energy is defocused and diverted from the detector. When the intensity of the optical energy reaches a second predetermined higher level, the critical angle is achieved whereupon the optical energy is reflected away from the interface rather than through it. The liquid material of the film also includes an optically absorbent dye for attenuating optical energy of predetermined wavelengths transmitted through the film prior to defocusing and total reflection.

9 Claims, 4 Drawing Sheets

OPTICAL SWITCH DEVICE

BACKGROUND OF THE INVENTION

This invention relates generally to optical power limiters and more particularly to an infra-red switch device utilizing thermal lensing and optically induced internal total reflection.

There is increased use of lasers for both military and domestic applications. For these applications there is a need for protecting visible and infra-red (IR) optical apparatus, optical components, or materials from the high power of a laser beam generated by or directed to such apparatus. The problem of providing this protection comprises devising suitable means for manipulating the intensity of the incident laser radiation.

With conventional technology, manipulation of the incident laser radiation has been accomplished by beam attentuating devices configured by means of mechanical, acousto-optical or electrical-optical apparatus. Such apparatus typically requires an external electrical signal to provide active control of the device. However, such apparatus is too slow to be useful as shields against short laser pulses.

Accordingly, it is an object of the present invention to provide an improvement in optical power limiters.

It is a further object of the invention to provide an optical switch for limiting or diverting the high power of a laser beam.

It is yet another object of the invention to provide an improvement for manipulating the intensity of a high powered infra-red radiation source.

And it is yet a further object of the invention to provide a self-activated non-linear optical power limiter for use as a switch for laser induced infra-red radiation.

SUMMARY

Briefly, the foregoing and other objects of the invention are accomplished by an optical power limiter or switch which is transparent at low light intensity and opaque at high intensity. Briefly, the invention is comprised of a pair of right triangular prisms separated by a liquid film whose refractive index changes and provides defocusing and diverting effects on the incidence of optical energy from a laser, for example. A first or input lens focuses the light upon the liquid film at an angle less than the critical angle of total reflection of the prism-liquid interface and a second or output lens refocuses the laser energy to a detector through an aperture. The liquid film in its preferred form is contained in a cell structure comprised of a pair of identical generally flat plates of the same material as the prisms. The liquid film is comprised of material whose index of refraction decreases in response to incident optical energy. When the intensity of the optical energy reaches a first predetermined level, the optical energy is defocused and diverted away from the detector. When the intensity of the optical energy reaches a second predetermined level, the optical energy is reflected away from the interface rather than through it. The liquid film can also include optically absorbent dye for attenuating high power optical energy of predetermined wavelengths transmitted through the interface prior to defocusing and total reflection.

BRIEF DESCRIPTION OF THE DRAWINGS

The details of the invention will be better understood when considered in conjunction with the following drawings wherein.

DETAILED DESCRIPTION OF THE INVENTION

The primary difficulty encountered in developing useful power limiters for lasers are the extreme power density and narrowness of the laser pulse when pulsewidths in the nanosecond(nsec) range are not unusual and are typical for visible and IR lasers. This provides very little time for a physical system to respond to the pulse let alone taking action against it. This has led to the use of self-activated mechanisms rather than those that are externally controlled. Highly non-linear optical materials are required for implementing self-activated power limiters due to the fact that their refractive indexes or absorption coefficients change with the intensity of the instant radiation. This change is utilized in the subject invention to provide a device that is transparent at low light intensity and opaque at high intensity. It has been discovered that thermally induced non-linearity in liquids set forth hereinafter is not only relatively large, but extremely fast. The power limiter or switch to be described utilizes a self-defocusing and non-linear liquid interface.

Figure 1:
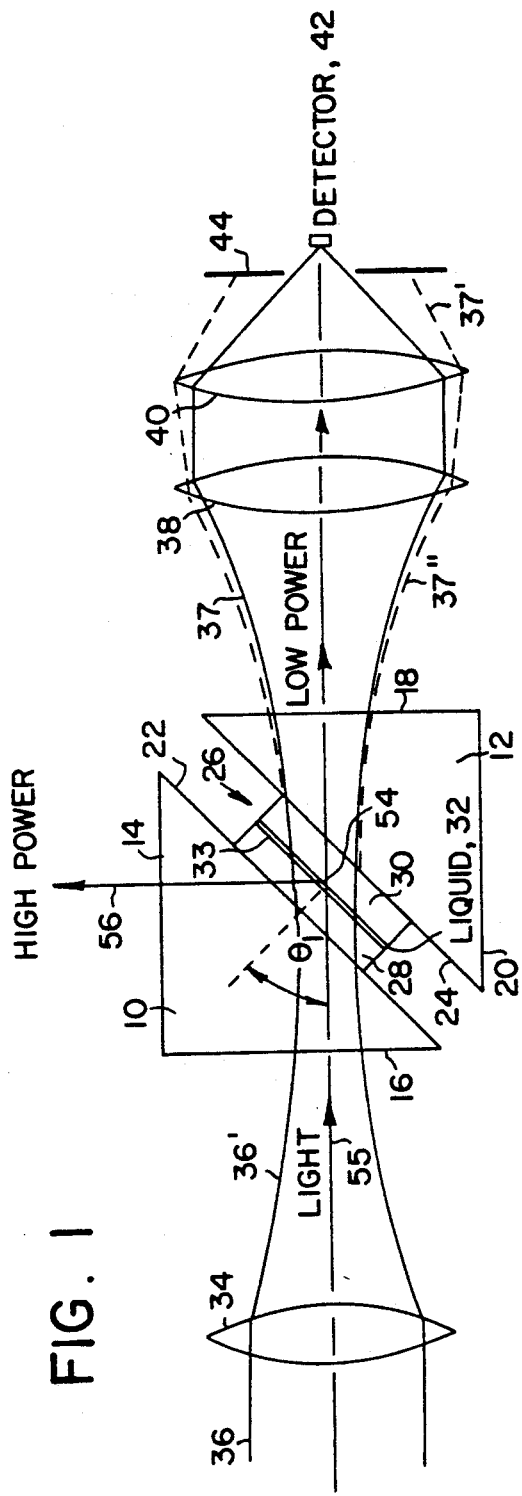
FIG. 1 is a diagrammatic illustration of the preferred embodiment of the invention.

Referring now to the drawings wherein like reference numerals refer to like elements, reference is first made to FIG. 1 which schematically discloses the preferred embodiment of an optical switch in accordance with this invention and utilized preferably for infra-red lasers. The invention is based on thermal lensing and induced internal total reflection. As shown, reference numerals 10 and 12 denote a pair of substantially identical right triangular prisms having a pair of orthogonal faces 14, 16 and 18, 20 and respective hypotenuse faces 22 and 24. The faces 22 and 24 mutually oppose one another and sandwiched therebetween is a liquid cell 26 comprised of two substantially identical planar slabs or plates 28 and 30 of optically transparent material. The prisms 10 and 12, moreover, are also comprised of optically transparent material and are preferably of the same material which make up the cell plates 28 and 30.

Further, as shown in FIG. 1, there is provided a relatively thin liquid film 32 between the two cell plates 28 and 30 and comprises the heart of the invention which will become evident as this detailed description proceeds.

Additionally, the embodiment of the invention shown in FIG. 1 also includes an input lens 34 which operates to focus an optical beam 36 generated, for example, by an infra-red(IR) source, not shown. The beam 36' emerging from the lens 34 is directed through the prism face 16 which emerges from the tilted hypotenuse face 22 at an incident angle $\theta_i$ relative to the inclined prism-liquid interface 33 located between the plates 28 and 30. As will be shown, low power optical energy in the beam 36' passes through the liquid cell 26 where it enters and exits the prism faces 24 and 18, respectively, as a diverging beam 37. A pair of output lenses 38 and 40 are placed adjacent the prism face 18 of prism 12 and operate to reimage or focus the light as a beam 37' where it is directed to a detector 42 through an aperture 44.

Figure 2:
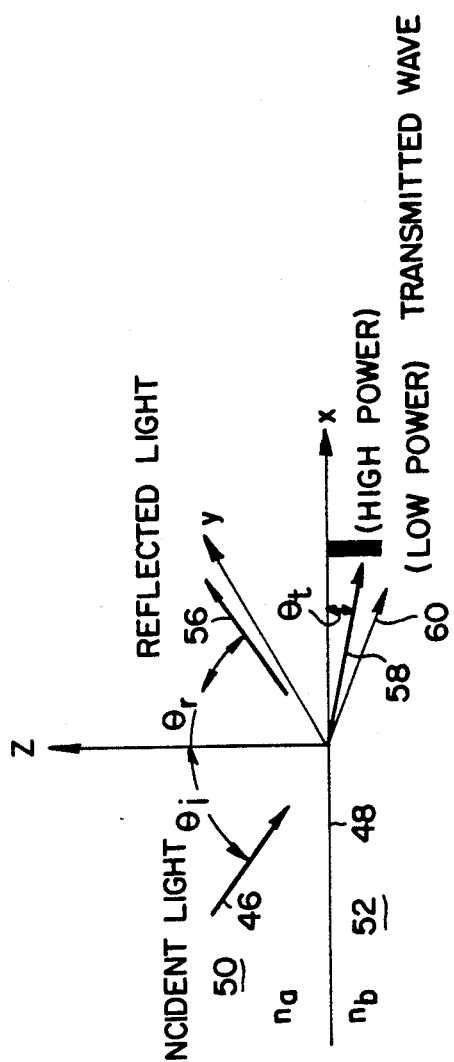
FIG. 2 is a diagram helpful in understanding the operation of the subject invention.

In order to understand the operation of the invention, reference will now be made briefly to FIG. 2. As is well known, when an infinite plane wave 46 is incident upon a planar boundary 48 separating two different optical media 50 and 52 having respective refractive indices $n_a$ and $n_b$ and being directed at an angle $\theta_i$ with respect to an axis perpendicular to the interface 48, the incident beam 46 will be transmitted to medium 48 at an angle $\theta_t$ until a critical angle $\theta_c$ is reached, i.e., where $\theta_i = \theta_c$ whereupon total reflection will take place back into the medium 50 at an angle $\theta_r$.

Accordingly in the embodiment shown in FIG. 1, the liquid film 32 is comprised of a liquid mixture which when exposed to an intense pulsed laser beam 36, having a confocal length longer than the thickness of the liquid film 32 and wherein the beam 36 comprises a $TEM_{00}$ laser beam with a radially symmetric Gaussian intensity distribution, will be heated most strongly at the center of the beam as indicated by reference numeral 54, where the intensity is the greatest. Because the liquid cell 26 is tilted with respect to the optical path of the beam 36 and being at an angle $\theta_i$, the effect consequently forms a tilted lens-like optical element. For most materials, the increase in temperature lowers the refractive index n so that the optical path is shorter at the beam center 54 and accordingly it is equivalent to a divergent lens and thereby producing the beam 37". The lens action prevents radiation from transmitting completely through the aperture 44 while being reimaged at the detector 42 and therefore the power density at the detector 42 is limited.

As the radiation in the beam 36 becomes more intense, the change of the refractive index n at the central Portion 55 of the beam 36' begins to exhibit saturation and in a limiting situation, the liquid mixture is vaporized thereat. In this instance, the optical energy begins to be totally reflected from the liquid interface 32 and out of the prism face 14 as shown by reference numeral 56 because the incident angle $\theta_i$ is larger than the critical angle $\theta_c$ and where $\theta_c = \sin^{-1}(n_b/n_a)$. It can be seen, therefore, that the critical angle $\theta_c$ is a function of refractive index and if the refractive index is variable as a function of the optical power impinging thereon, the critical angle $\theta_c$ can be achieved for relatively high incident power, causing total reflection to occur.

The liquid mixture of the film 32 in its preferred form also includes optical absorbent material, to be discussed subsequently herein, which additionally limits predetermined wavelengths of relatively high power to be transmitted through the film as shown by the beam 37 of FIG. 1 prior to the self-defocusing and/or the transition to total reflection, thereby further limiting power of the optical beam of the wavelengths falling on the detector 42.

Details of the constituent materials for producing optical non-linearity, self-defocusing, laser-induced total reflection in the subject invention, will now be considered.

With respect to optical nonlinearity of liquid mixtures, a liquid mixture can produce a very large dynamic nonlinear effect due to the fact that absorption of incident light upon a liquid can heat up the liquid and change its refractive index. For an exposure time to the light longer than approximately 1 nsec, the temperature coefficient of the index of refraction can be expressed as:

$$dn/dT = (\partial n/\partial T)\rho + (\partial n/\partial \rho)(\partial \rho/\partial T) \quad (1)$$

and is determined primarily by changes in the sample density (second term). Most liquids, however, expand when heated, thus resulting in a negative value of $dn/dT$.

A typical example comprises using the parameters of liquid benzene with a dye component to represent an organic sample, where the density is 0.88 gcm$^{-3}$, the specific heat $C_p$ is 0.41 calg$^{-1}$K$^{-1}$, and thermal conductivity k is $3.41 \times 10^{-4}$ cal sec$^{-1}$cm$^{-1}$K$^{-1}$. Assuming that the absorptivity $a = 15$ cm$^{-1}$ and $dn/dT = -3.9 \times 10^{-4}$K$^{-1}$, one can estimate the rate of temperature increase $dT/dt$ for a 1-W laser focused on an area of 1 cm$^2$. The resultant $dT/dt$ is approximately 9.95 K sec$^{-1}$ for the case of short laser pulses in which one can ignore conduction. The $dT/dt$ will cause a decrease $\Delta n$ of refractive index of:

$$\Delta n = 3.9 \times 10^{-3} (W/cm^2)^{-1} sec^{-1} t(sec). \quad (2)$$

Figure 3:
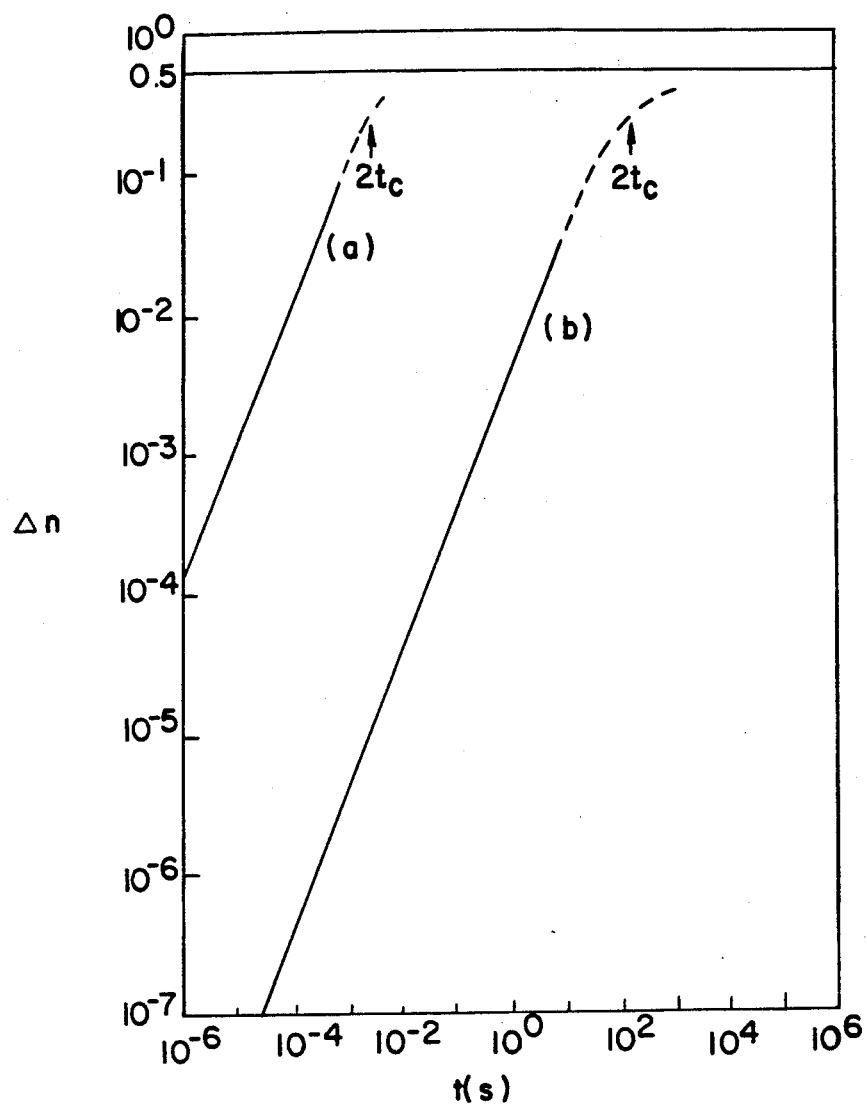
FIG. 3 is a set of curves illustrative of the relationship between change in refractive index as a function of exposure-time to a laser for the liquid film shown FIG. 1.

The change in refractive index $\Delta n$ is isotropic. The $|\Delta n|$ vs t curves of the above example are shown in FIG. 3. It is worth noting that the photothermal effect (for $t > 1$ msec) is comparable to the strong nonlinear optical effect in a semiconductor at the band edges. For example, $n_2$ of $Hg_{0.8}Cd_{0.2}Te$ (having $\lambda_g = 7.5$ $\mu$m and $= 26$ cm$^{-1}$ at 10.6 $\mu$m) is $8 \times 10^{-8}$ (W/cm$^2$)$^{-1}$ for 180 nsec and is estimated to be approximately $1.2 \times 10$ (W/cm$^2$)$^{-1}$ at steady state. In fact, the photothermal effect can be 10 times larger if a sample has 10 times larger $\alpha$. For laser lines that fall into the absorption band of a mixture, the $dn/dT$ may be enhanced due to a resonant effect.

As the energy absorbed by the mixture increases, either because of higher incident Power or longer exposure time, the mixture will heat up to vaporization. As a consequence, the $\Delta n$ will be saturated. Considering that n for a typical liquid is approximately 1.5 and for its vapor is approximately 1.0, the $|\Delta n|$ will be saturated at approximately 0.5. The saturation is very important in power-limiting design of this invention.

As to self-defocusing, when a liquid mixture is exposed to a pulsed laser as was described above, the thermal-photo effect induced a tilted lens-like optical element in the mixture. The thermally induced effect is time dependent and it requires a finite time to form the lens. The tilting of the cell as shown in FIG. 1 results in a complicated lens having two different focal lengths. For the case considered, i.e., where the laser pulse is shorter than the diffusion characteristic time, i.e., $t < < t_c$, both the induced focal lengths f(t) have the following dependence $$f(t) \propto \frac{\pi J W_1^4 \rho C_p}{8P(dn/dT)\alpha lt} \tag{3}$$

where J is the Joule's constant, $W_1$ the beam radius at the sample, P the laser power, l the thickness, and t the exposure time, respectively. The response is proportional to $W_1^4$, $\rho$, and $c_p$, and inversely proportional to P, dn/dT, $\alpha$, and l. Because the lensing effect becomes stronger as the gradient of the spatial change in n becomes larger, a lens 34 is used to focus the incoming radiation on the liquid cell 26.

Considering now the non-linearity of the interface 32, when the radiation becomes more intense, the change of the refractive index at the central portion of the beam starts to exhibit saturation. The extreme case is that the liquid becomes vaporized at 54. In this situation, the optical energy begins to transmit through two flat boundaries. The reflected angle $\theta_r$ and transmitted angle $\theta_t$ (FIG. 2) are related to the incident angle $\theta_i$ as:

$$\theta_r = \theta_i \tag{4}$$

$$\theta_t = \sin^{-1}(\sin \theta_i/n) \tag{5}$$

where $$n = n_b/n_a \tag{6}$$

and $n_a$ and $n_b$ are the indices of refraction of the two media.

As is well known, transmissivity and reflectance depend on n and $\theta_i$ for both the transverse electric and magnetic field cases. Although their actual dependences are different, the transmission and reflection for both polarizations have a common feature: total internal reflection occurs when $n<1$ and $\theta_i > \theta_c$, i.e., where $$\theta_c = \sin^{-1}(n) \tag{7}$$

To illustrate the non-linear-interface phenomenon, it is only necessary to discuss cases in which the medium 52 is non-linear and has a negative $n_2$, i.e., $n_b = n_{bo} + n_2 I$. The results can be easily extended to cases with positive $n_2$ as well as to cases where "a" is the non-linear medium and "b" is the linear medium.

Substituting $n_b$ into Eq. (7) gives the power density-dependent $\theta_c$ as:

$$\theta_c(I) = \sin^{-1}\left(\frac{n_{bo} + n_2 I}{n_a}\right) \tag{8}$$

In other words, when the incident power density increases, the critical angle $\theta_c$ decreases. If the incident angle $\theta_i$ is selected to be less than $\theta_c(0) = \sin^{-1}(n_{bo}/n_a)$, a low-power beam 37 (FIG. 1) or 60 (FIG. 2) will transmit through the interface. However, as power density increases and the critical angle decreases to be closer to $\theta_i$, transmissivity is reduced. Further increases in intensity I shifts $\theta_c$ to angles less than $\theta_i$ and results in total internal reflection, i.e., the optical density of the limiter becomes infinite since no transmission is possible.

Figure 4:
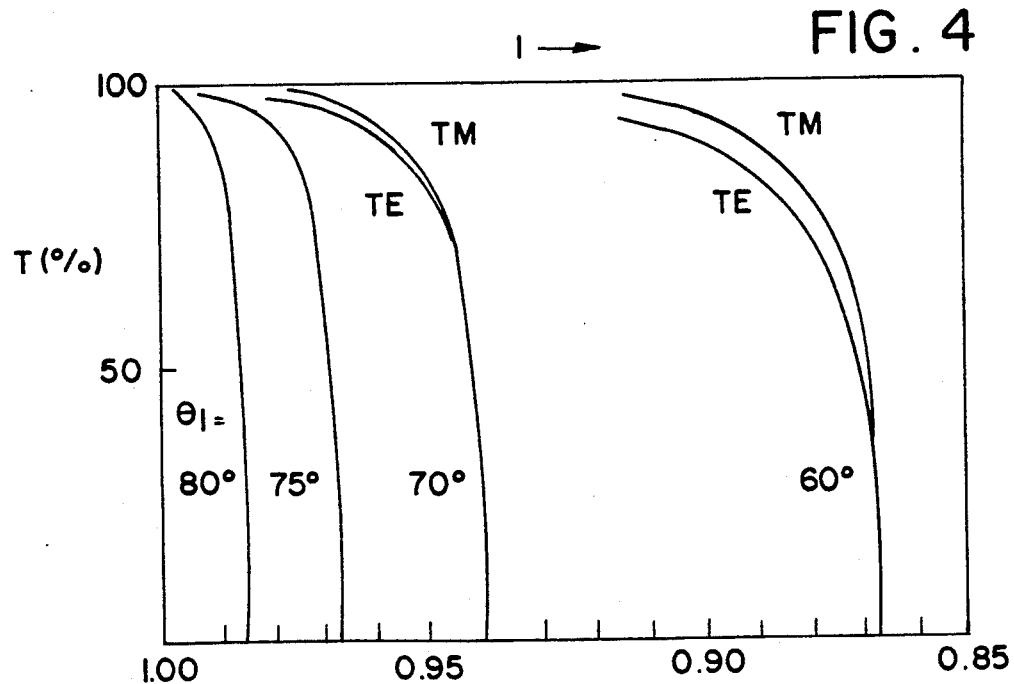
FIG. 4 is a set of characteristic curves illustrative of the transmission characteristic as a function of relative refractive index for several different incident angles shown in FIG. 2.

FIG. 4 illustrates the theoretical transmission through a non-linear interface for various incident angles. At large $\theta_i$, transmissivity changes are more abrupt when the intensity I increases. For example, when $\theta_i = 80°$ and $n_{bo}/n_a = 0.988$, the low power transmissivity is higher than 80%. But, a change in n of as little as 0.002 due to an intensity increase completely blocks the high-power incident beam. At $\theta_i = 60°$ and $n_{bo}/n_a = 0.885$, transmissivity can also be higher than 80%. However, n must change by at least 0.021 to produce total internal reflection of the interface. Therefore, a larger $\theta_i$ is preferred for optical switching because the threshold power density needed to cause switching from high transmissivity to total internal reflection is smaller. However, a selection of large $\theta_i$ will limit applications to a small field of view.

Some degree of switching can also be achieved by the dependence of $\theta_t$ in I, which is induced by an increase in the intensity dependent $n_b$. Substituting $n_b$ into Eq. (5), there results, $$\theta_t = \sin^{-1}\left(\frac{n_a \sin \theta_i}{n_{bo} + n_2 I}\right) \tag{9}$$

Calculations made indicate that for $\theta_i = 60°$, the resultant $\theta_t$ is 77.56° for a low-power beam. A change in n of only 0.0135 will deflect the transmitted beam 5°, so that $\theta_t$ becomes 82.56°. As can be seen in FIG. 3, such a change in n can occur in 100 $\mu$sec or less for a 0.38-W laser focused to 40 $\mu$m in diameter. Therefore, the non-linear-interface phenomenon is extremely rapid.

Considering the liquid mixtures for the film 32 (FIG. 1), several mixtures were prepared by dissolving an optical energy absorber into the host liquids. To provide reasonable transmission of the final materials for lasers operating in the far infra-red (IR), the host liquids for the absorptive liquid mixtures must be transparent in the 8 to 14 $\mu$m spectral range. To provide reasonable transmission for other selected wavelength ranges, other materials can be utilized. Several liquids were selected that do not have significant absorption bands in the desired spectral range. These include the tetrahedral $XY_4$ molecules, e.g., carbon tetrachloride ($CCl_4$) and tri-bromo methane ($CHBr_3$), or the linear, symmetric $XY_2$ molecule, e.g. carbon disulfide ($CS_2$). For a cell thickness of 100 $\mu$m, $CCl_4$, $CHBr_3$ and $CS_2$ all exhibit relatively good transmission. $CCl_4$ transmits well in the 8 to 12 $\mu$m region, with some weak absorption (overtone bands) at 8, 9, and 10 $\mu$m. $CHBr_3$ shows a strong absorption band at 8.8 $\mu$m and three weak bands at 11.5, 12.5 and 13.5 $\mu$m. $CS_2$ on the other hand, has the best transmission with only one weak absorption band at 11.7 $\mu$m.

Figure 5:
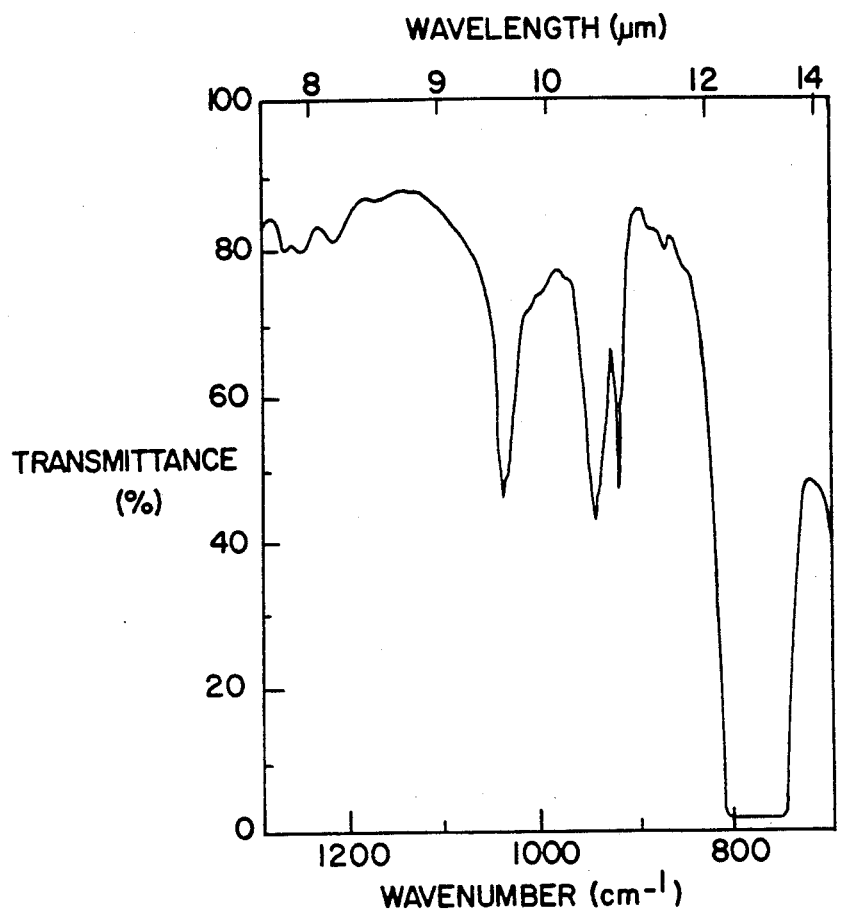
FIGS. 5, 6 and 7 are characteristic curves illustrative of transmission spectra of liquid mixtures utilized for the liquid film shown in FIG. 1.
Figure 6:
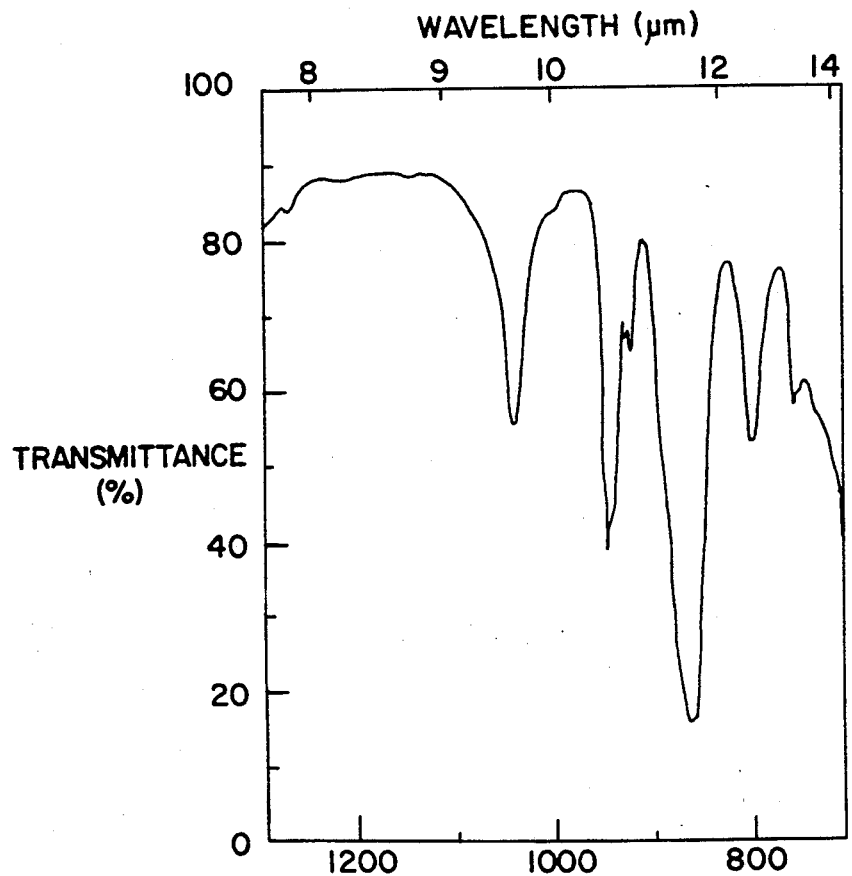

The criterion for the mixtures of the liquid film, therefore, is to have high in-band and low outband absorptions, and at low-power radiation levels, the device should have a high overall transmission in the spectral range for use. At high-power levels, however, it must have a sensitive switching threshold based on the photothermal effects. The mixtures can be further divided into two categories, two-band absorbing mixtures and broad-band absorbing mixtures. For the first category, absorption centered at the 9.7 and 10.6 $\mu$m bands can be introduced by adding acetonitrile and 2-methyleneglutaronitrile optical absorbing material to $CCl_4$ or $CS_2$. A small amount of carbon bromide ($CBr_4$) added to help the dissolution fortunately introduces only three weak absorption bands at 10.7, 12.7, and 13.4 $\mu$m. The IR spectra of two of the mixtures as shown in FIGS. 5 and 6 clearly indicates the desired properties of high in-band and low out-band absorptions. Their components are listed in Table I below for two samples, i.e., Nos. 1 and 2.

Figure 7:
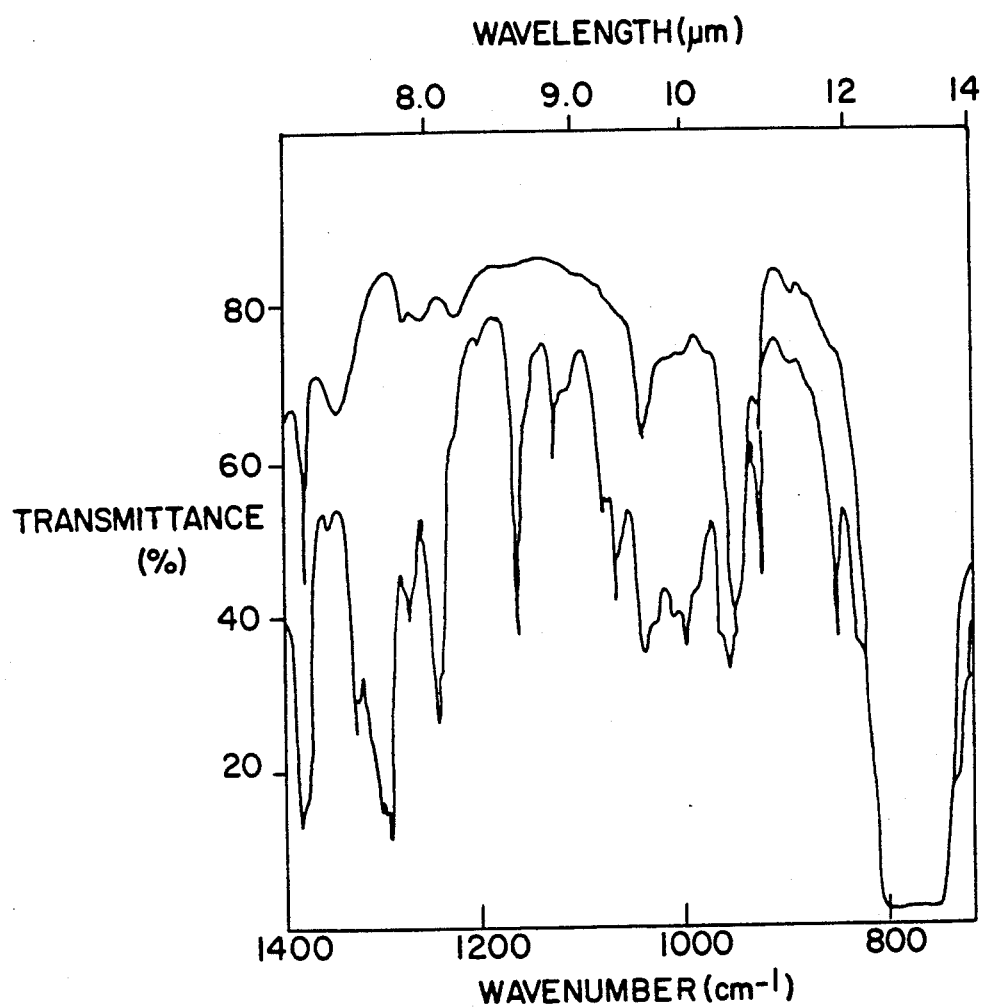

Insofar as the second category is concerned, the desired liquid mixture should have approximately 50% absorption in the 9 to 11 $\mu$m range and low transmission loss out of the band. A mixture was developed having a transmission spectrum (FIG. 7) that closely meets the criteria. Its components are also listed in Table I as sample NO. 3.

In the preferred embodiment of the invention, the liquid cell 26 and the prisms 10 and 12 need to be not only IR transparent but their refractive indexes must also be closely matched to the liquid film 32 to minimize the reflective loss. Because the refractive index of a liquid usually is smaller than 2, the following materials have been found to be acceptable for use: calcium fluoride ($CaF_2$), barium fluoride ($BaF_2$), sodium chloride (NaCl), potassium chloide (KCl), potassium bromide (KBr), calcium bromide ($CaBr_2$) and cesium iodide (CsI). However, each one has some disadvantages, e.g., $CaF_2$ does not transmit well beyond 12 $\mu$m, $BaF_2$ is very sensitive to thermal shock, and the others are soluble in water. On the basis of economy, NaCl comprises the preferred material for both the prisms and cell as shown in Table I; however, KCl could be used when desirable.

TABLE I

| Switch | Prism & Cell | Interface Liquid | Interface Thickness |
|---|---|---|---|
| Sample No. 1 | NaCl | $CCl_4$ + $CBr_4$ + acetonitrile + 2-methyleneglutranitrile | 100 $\mu$m |
| Sample No. 2 | NaCl | $CS_2$ + $CBr_4$ + acetonitrile + 2-methyleneglutanonitrile | 1 mm |
| Sample No. 3 | NaCl | $CCl_4$ + $CBr_4$ + $CH_3CN$ + 2-methylenegluteronitrile + 2-chlorobutane + 1,4-dichlorobutane + tri-butyl phosphate | 100 $\mu$m |

An optical limiter or switch configured in accordance with this invention has very high damage resistance against IR laser pulses longer than 5 $\mu$sec. It exhibits very high opacity (less than $10^{-2}$% transmission) for the "on" state, and is very versatile, meaning that it is easy to adjust its insertion loss, operating wavelength band, and switching sensitivity. Moreover, it is of low cost, and is simple in construction. The invention can be extended to any desired wavelength just by properly selecting liquids, prisms, and other optical components or by replacing the liquid with other optically nonlinear materials such as nonlinear organic materials. The device can also be used in laser treatment of materials for reducing fluctuation in laser power.

Having thus shown and described what are at present considered to be the preferred embodiments of the invention, it should be noted that they have been made by way of illustration and not of limitation. Accordingly, all modifications, alterations and changes coming within the spirit and scope of the invention as set forth in the appended claims are herein meant to be included.

What is claimed is:
1. An optical power limiter and switch device, comprising:
   a pair of optically transparent prisms having mutually opposing inclined faces relative to an incident beam of optical energy; and
   a self-defocusing and optically non-linear liquid mixture including a host liquid and an optical energy absorbing liquid, said liquid mixture mounted between said inclined faces, said liquid mixture being self-activated so as to defocus an incident beam of optical energy of increasing intensity and to change the critical angle so that an incident beam exceeding a certain energy threshold will be totally reflected.
2. The device as defined by claim 1 wherein said host liquid includes tetrahedral $XY_4$ molecules.
3. The device as defined by claim 2 wherein said tetrahedral $XY_4$ molecules include $CCl_4$ and $CHBr_3$.
4. The device as defined by claim 1 wherein said host liquid includes a linear symmetric $XY_2$ molecule.
5. The device as defined by claim 4 wherein said linear symmetric $XY_2$ molecule includes $CS_2$.
6. The device as defined by claim 1 wherein said optical energy absorbing liquid includes acetonitrile and 2-methyleneglutaronitride.
7. The device as defined by claim 1 wherein said liquid film comprises a mixture of $CCl_4$+$CBr_4$+acetonitrile+2-methyleneglutaronitrile.
8. The device as defined by claim 1 wherein said liquid film comprises a mixture of $CS_2$+$CBr_4$+acetonitrile+2-methyleneglutanonitrile.
9. The deviced as defined by claim 1 wherein said liquid film comprises a mixture of $CCl_4$+$CBr_4$+$CH_3CH$+2-methylenegluteronitrile+2-chlorobutane+1,4-dichlorobutane+tri-butyl phosphate.

* * * * *

UNITED STATES PATENT AND TRADEMARK OFFICE
CERTIFICATE OF CORRECTION

PATENT NO. : 5,018,842
DATED : May 28, 1991
INVENTOR(S) : Wenpeng Chen

It is certified that error appears in the above-identified patent and that said Letters Patent is hereby corrected as shown below:

Column 1, line 4, after "BACKGROUND OF THE INVENTION" insert the following paragraph:

--This invention was made with Government support under DAAK70-84-C-0022 awarded by U.S. Army Belvoir Research & Development Center. The Government has certain rights in this invention.--.

Signed and Sealed this

Eighth Day of June, 1993

*Attest:*

MICHAEL K. KIRK

*Attesting Officer*  Acting Commissioner of Patents and Trademarks